United States Patent
In et al.

(10) Patent No.: US 9,543,794 B2
(45) Date of Patent: Jan. 10, 2017

(54) MOTOR AND WASHING MACHINE HAVING THE SAME

(71) Applicant: SAMSUNG ELECTRONICS CO., LTD., Suwon-si, Gyeonggi-do (KR)

(72) Inventors: Byung Ryel In, Yongin-si (KR); Young Kwan Kim, Anyang-Si (KR); Woong Hwang, Suwon-si (KR); Keun Young Yoon, Osan-si (KR); Su Kwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 535 days.

(21) Appl. No.: 13/754,075

(22) Filed: Jan. 30, 2013

(65) Prior Publication Data
US 2013/0199249 A1    Aug. 8, 2013

(30) Foreign Application Priority Data

Feb. 3, 2012    (KR) .......................... 10-2012-0011425

(51) Int. Cl.
| | | |
|---|---|---|
| *H02K 1/14* | (2006.01) | |
| *H02K 1/16* | (2006.01) | |
| *H02K 15/02* | (2006.01) | |
| *D06F 37/30* | (2006.01) | |

(52) U.S. Cl.
CPC .............. *H02K 1/165* (2013.01); *D06F 37/30* (2013.01); *D06F 37/304* (2013.01); *H02K 1/146* (2013.01); *H02K 15/02* (2013.01)

(58) Field of Classification Search
CPC .......... H02K 1/146; H02K 1/148; H02K 1/16; H02K 1/165; H02K 15/02
USPC .............................. 310/51, 216.008, 216.011, 216.045,310/216.043, 216.044, 216.048
IPC ...................................... H02K 1/14,1/16, 15/02
See application file for complete search history.

(56) References Cited

U.S. PATENT DOCUMENTS

| | | | | |
|---|---|---|---|---|
| 1,779,950 A | * | 10/1930 | Reichel ................. | H02K 1/185 310/216.011 |
| 7,777,387 B2 | * | 8/2010 | Nagai .................. | H02K 15/022 29/596 |
| 7,847,466 B2 | * | 12/2010 | Nagai ................... | H02K 1/148 310/216.004 |

(Continued)

FOREIGN PATENT DOCUMENTS

| | | |
|---|---|---|
| CN | 101553974 | 10/2009 |
| CN | 101641852 | 2/2010 |

(Continued)

OTHER PUBLICATIONS

Chinese Office Action dated Jun. 1, 2016 from Chinese Patent Application No. 201310043874.0, 26 pages.

(Continued)

*Primary Examiner* — John K Kim
(74) *Attorney, Agent, or Firm* — Staas & Halsey LLP (57) ABSTRACT

A motor includes an enhanced strength of a stator, the stator being formed with a plurality of core plates stacked one on top of another, and a rotor rotatably disposed at an inner side or at an outer side of the stator. Each core plate includes a body provided in a shape of an arc, a plurality of teeth radially extended from the body, and having a coil wound thereto, at least one first slit part formed on the body by being slit in a radial direction of the body, and at least one second slit part formed on the body by being slit in a circumferential direction of the body.

19 Claims, 8 Drawing Sheets

(56) References Cited

U.S. PATENT DOCUMENTS

| | | | |
|---|---|---|---|
| 7,986,064 B2 * | 7/2011 | Katagiri | H02K 1/148 310/216.008 |
| 8,474,579 B2 * | 7/2013 | Hyun | F16D 55/226 188/156 |
| 8,674,579 B2 * | 3/2014 | Jang | H02K 1/148 310/216.008 |
| 8,833,112 B2 * | 9/2014 | Ahn | D06F 37/304 310/216.043 |
| 8,941,274 B2 * | 1/2015 | Gianni | H02K 1/148 310/216.011 |
| 2007/0096587 A1 * | 5/2007 | Ionel | H02K 1/148 310/216.009 |
| 2010/0213785 A1 * | 8/2010 | Nagai | H02K 1/148 310/216.043 |
| 2011/0016929 A1 * | 1/2011 | Ahn | D06F 37/304 68/140 |
| 2013/0169104 A1 * | 7/2013 | Jang | H02K 1/148 310/216.009 |
| 2013/0199249 A1 * | 8/2013 | In | H02K 1/165 68/140 |
| 2013/0249327 A1 * | 9/2013 | Gianni | H02K 1/148 310/43 |

FOREIGN PATENT DOCUMENTS

| | | |
|---|---|---|
| CN | 101772875 | 7/2010 |
| JP | 11-262202 | 9/1999 |
| JP | 11-289695 | 10/1999 |
| JP | 2005-168128 | 6/2005 |

OTHER PUBLICATIONS

Chinese Office Action dated Nov. 3, 2016 from Chinese Patent Application No. 201310043874.0, 4 pages.

* cited by examiner

MOTOR AND WASHING MACHINE HAVING THE SAME

CROSS-REFERENCE TO RELATED APPLICATIONS

This application claims the priority benefit of Korean Patent Application No. 10-2012-0011425, filed on Feb. 3, 2012, in the Korean Intellectual Property Office, the disclosure of which is incorporated herein by reference.

BACKGROUND

1. Field

Embodiments disclosed herein relate to a motor configured to generate a rotation force and a washing machine having the same.

2. Description of the Related Art

A motor is an apparatus configured to obtain rotation force from electric energy, and generally includes a stator and a rotor. The rotor may be composed to reciprocally act with respect to the stator in an electromagnetic manner, and may be rotated by the force that acts in between a magnetic field and the current that flows through a coil.

The stator may be formed by stacking press-processed metallic plates to each other. In order to reduce the amount of scraps (e.g., scrap metal) generated during a press processing, the metallic plates may be punched in a linear shape and stacked, and the metallic plates which are stacked may be bent into a shape of an arc.

In general, in order to easily bend the stacked metallic plates, slit grooves are formed on the metallic plates, and by using the slit grooves, the bending work may easily be performed. However, as a result of the bending action, the strength of the metallic plates is decreased, and in a case of running a motor, noise may be generated from the stator as a result of a mechanical vibration or an electromagnetic vibration.

SUMMARY

Therefore, it is an aspect of the present disclosure to provide a motor having an enhanced strength of a stator, and a washing machine having the same.

Additional aspects of the disclosure will be set forth in part in the description which follows and, in part, will be apparent from the description, or may be learned by practice of the disclosure.

In accordance with one aspect of the present disclosure, a motor includes a stator and a rotor. The stator may be formed with a plurality of core plates being stacked one on top of another. The rotor may be rotatably disposed at an inner side or at an outer side of the stator. The core plate may include a body, a plurality of teeth, at least one first slit part and at least one second slit part. The body may be provided in a shape of an arc. The plurality of teeth may be radially extended from the body, and having a coil wound thereto. The at least one first slit part may be formed on the body by being slit in a radial direction of the body. The at least one second slit part may be formed on the body by being slit in a circumferential direction of the body.

The second slit parts may be symmetrically disposed to each other while interposing the first slit part thereinbetween.

At least one of the first slit parts may be communicated with the second slit part.

The first slit part and the second slit part may be disposed between two teeth adjacent with respect to each other among the plurality of teeth.

The body may include a plurality of strength maintenance parts disposed adjacent to the first slit part and the second slit part to maintain a strength of the body between the plurality of teeth.

The plurality of strength maintenance parts may be alternately disposed with the first slit parts in the radial direction of the body.

The core plates may be stacked and bent to form a unit core assembly, and the stator may be formed by coupling the unit core assemblies.

In a process of bending the unit core assembly into a shape of an arc, a width of a region of the first slit part adjacent to the teeth may be decreased to a larger degree when compared to the remaining portion of the first slit part.

In a process of bending the unit core assembly into a shape of an arc, a width of a region of the second slit part adjacent to the first slit part may be decreased to a larger degree when compared to the remaining portion of the second slit part.

In accordance with another aspect of the present disclosure, a washing machine includes a body, a tub disposed at an inside the body to store washing water, a drum disposed at an inside of the tub while being rotatably supported by the tub through a driving shaft, and a motor mounted at the tub and configured to rotate the driving shaft. The motor may include a stator and a rotor. The stator may be formed with a plurality of core plates being stacked one on top of another. The rotor may be rotatably disposed at an inner side or at an outer side of the stator. The core plate may include a body, a plurality of teeth and a plurality of bending parts. The body may be provided in a shape of an arc. The plurality of teeth may be radially extended from the body, and having a coil wound thereto. The plurality of bending parts may be formed by slitting at least one portion of the body, which is positioned in between teeth adjacent to each other among the plurality of teeth, in a radial direction and in a circumferential direction.

The bending part may include at least one first slit part, at least one second slit part and a plurality of strength maintenance parts. The at least one first slit part may be formed by being slit in a radial direction of the body. The at least one second slit part may be formed by being slit in a circumferential direction of the body. The plurality of strength maintenance parts may be disposed adjacent to the first slit part and the second slit part to maintain a strength of the body positioned in between the plurality of teeth.

The plurality of strength maintenance parts may be disposed while interposing at least one of the plurality of first slit parts therebetween in a radial direction of the body.

The core plates may be stacked and bent to form a unit core assembly, and in a process of bending the unit core assembly, a width of a region of the first slit part adjacent to the teeth may be decreased to a larger degree when compared to the remaining portion of the first slit part, while a width of a region of the second slit part adjacent to the first slit part may be decreased to a larger degree when compared to the remaining portion of the second slit part.

At least one of the plurality of the first slit parts may be provided with one end thereof open such that the unit core assembly is bent through the bending part.

In accordance with another aspect of the present disclosure, a motor for a washing machine configured to be used to rotate a drum of the washing machine includes a stator and a rotor. The stator may be formed with a plurality of core plates being stacked one on top of another. The rotor may be rotatably provided while electromagnetically interacting with the stator. The core plate may include a body, a plurality of teeth, at least one first slit part, and at least one second slit part. The body may be provided in a shape of an arc. The plurality of teeth may be radially extended from the body. The at least one first slit part may be formed by slitting at least one portion of the body positioned in between teeth, which are adjacent to each other among the plurality of teeth, in a first direction. The at least one second slit part may be disposed while interposing the at least one first slit part therebetween, and may be formed by slitting the at least one portion of the body positioned in between the teeth, which are adjacent to each other among the plurality of teeth, in a second direction different from the first direction.

At least one of the at least one second slit part may intersect with the first slit part.

The core plates may be stacked and bent to form an unit core assembly, and the unit core assembly may be bent while having a position, at which the first slit part and the second slit part intersect each other, as a center.

In accordance with another aspect of the present disclosure a stator includes a plurality of core plates stacked one on top of another. Each core plate includes an arc-shaped body, a plurality of teeth which extend from the body, a first slit part formed in the body in a first direction, between two adjacent teeth, a second slit part formed in the body in the first direction, between the two adjacent teeth, and having an opening along a side of the body from which the teeth extend, and a third slit part formed in the body in a second direction, communicating with the first slit part.

The third slit part may include a horizontal part disposed in the first direction which communicates with the first slit part and an inclined part which extends from the horizontal part toward the side of the body from which the teeth extend.

Each core plate may further include a plurality of strength maintenance parts, including a first strength maintenance part disposed between the first slit part and the second slit part, and a second strength maintenance part disposed between the first slit part and a side of the body opposite to the side of the body from which the teeth extend.

As described above, since slit parts being slit in different directions from each other are formed at a core plate, a bending work of the core plate may be easily performed.

In addition, as a strength maintenance part is provided at a position adjacent to the slit part, the strengths of a core plate and a stator, which is formed by stacking the core plates, are enhanced, and the noise and the vibration generated from the stator may be decreased.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

A motor in accordance with the embodiments of the present disclosure may be applied to a washing machine, an air conditioner, an electric vehicle, a light rail vehicle, and an electric bicycle, a small generator, and the like. Hereinafter, for the sake of convenience, the washing machine will be used as one example application.

Figure 1:
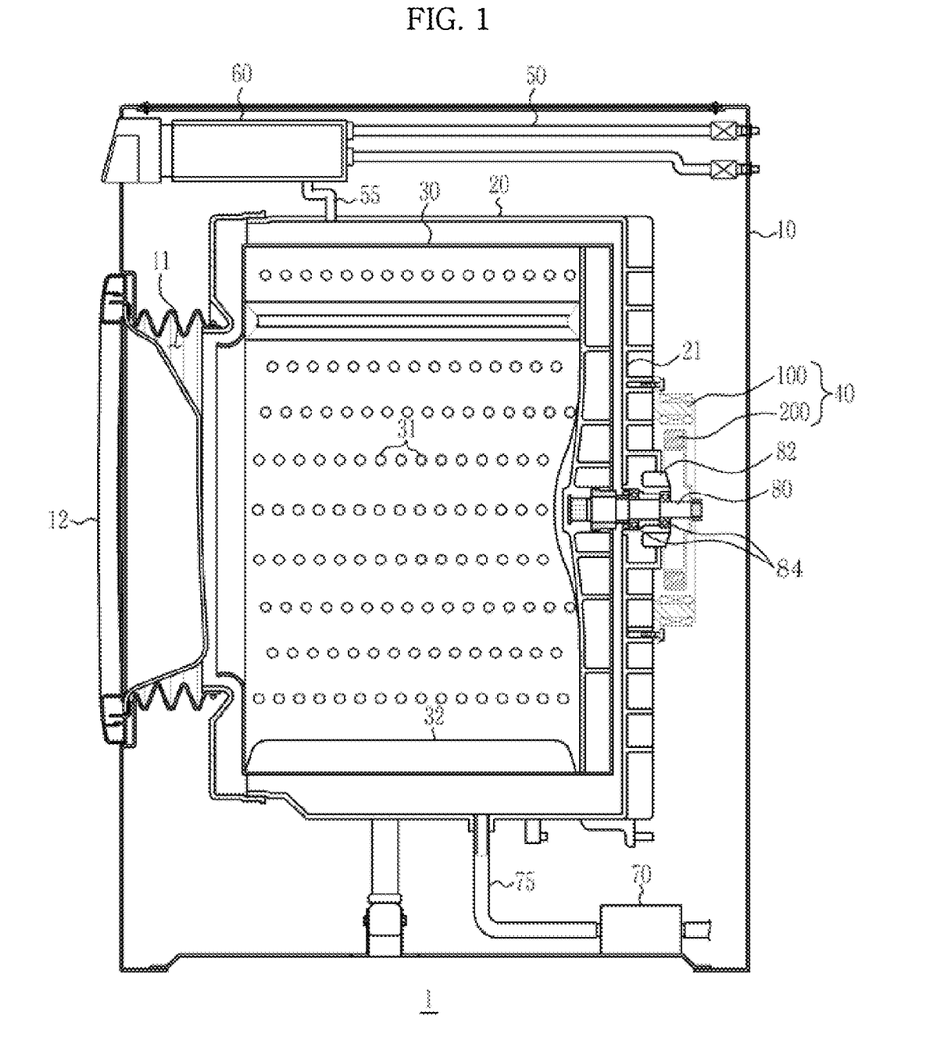
FIG. 1 is a drawing illustrating main components of a washing machine in accordance with one embodiment of the present disclosure.

FIG. 1 is a drawing illustrating main components of a washing machine in accordance with one embodiment of the present disclosure.

As illustrated in FIG. 1, a washing machine 1 may include a cabinet 10 forming an exterior appearance, a tub 20 disposed at an inside the cabinet 20, a drum 30 rotatably disposed at an inside the tub 20, and a motor 40 to drive the drum 30.

At a front surface unit of the cabinet 10, an input unit 11 is formed so that a laundry may be inserted into an inside the drum 30. The input unit 11 may be opened and closed by a door 12 installed at the front surface unit of the cabinet 10.

At an upper portion of the tub 20, a water supply pipe 50 configured to supply washing water to the tub 20 is installed. One side of the water supply pipe 50 is connected to an outside water supply source (not shown), and the other side of the water supply pipe 50 is connected to a detergent supply apparatus 60. The detergent supply apparatus 60 is connected to the tub 20 through a connection pipe 55. The water being supplied through the water supply pipe 50 passes through the detergent supply apparatus 60, and is supplied to an inside of the tub 20 along with the detergent.

At a lower portion of the tub 20, a drain pump 70 and a drain pipe 75 are installed to discharge the water from inside the tub 20 to outside of the cabinet 10.

At the surroundings of the drum 30, a plurality of penetration holes 31 may be formed for the circulation of washing water, and at an inner circumferential surface of the drum 30, a plurality of lifters 32 may be installed so that an ascension and a descension of a laundry may take place when the drum 30 is rotated.

The drum 30 and the motor 40 are connected to each other through a driving shaft 80. The driving shaft 80 delivers rotation force of the motor 40 to the drum 30. One end of the driving shaft 80 is connected to the drum 30, and the other end of the driving shaft 80 is extended to an outer side of a rear wall 21 of the tub 20.

At the rear wall 21 of the tub 20, a bearing housing 82 may be installed so that the driving shaft 80 may be rotatably supported. The bearing housing 82 may be provided with aluminum alloy, and may be inserted into the rear wall 21 of the tub 20 when the tub 20 is injection-molded. In between the bearing housing 82 and the driving shaft 80, one or more bearings 84 may be installed so that the driving shaft 80 may be smoothly rotated.

Figure 2:
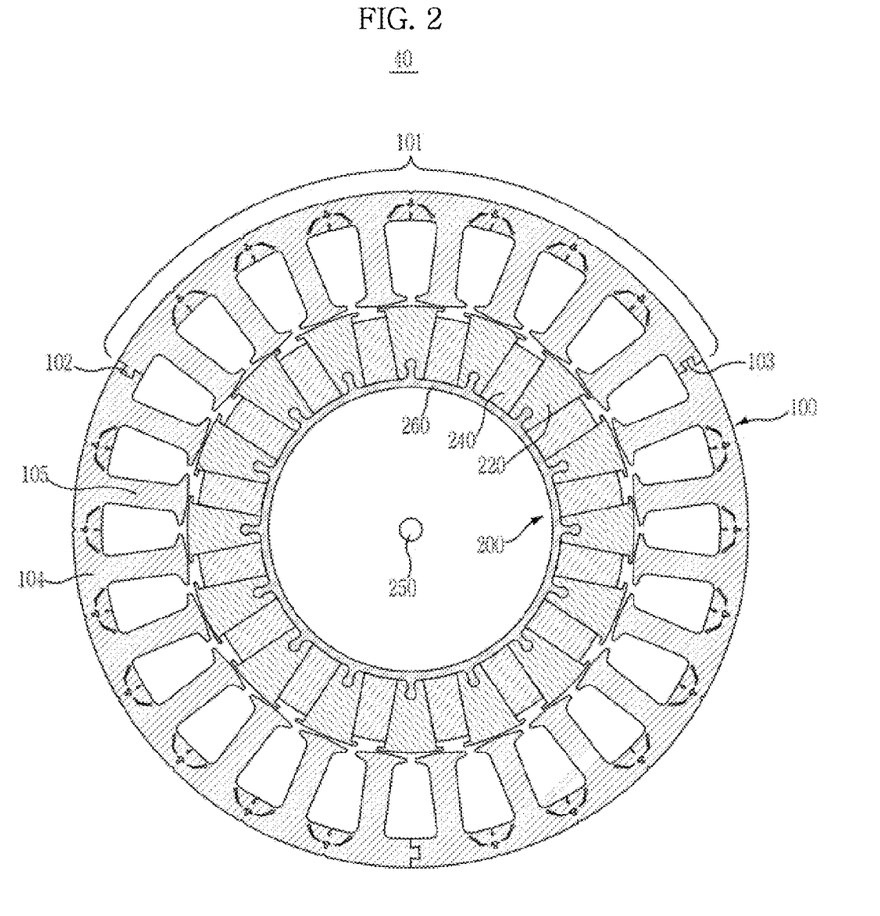
FIG. 2 is a drawing illustrating main components of a motor in accordance with one embodiment of the present disclosure.

FIG. 2 is a drawing illustrating main components of the motor in accordance with one embodiment of the present disclosure, which may be applied to the washing machine of FIG. 1 as motor 40. The motor in accordance with the one embodiment of the present disclosure includes an inner-rotor type having a rotor disposed at an inner side of a stator, and an outer-rotor type having a rotor disposed at an outer side of the stator. Hereinafter, for the sake of convenience, the inner-rotor type will be used as a reference for the description of the motor.

As illustrated in FIG. 1 and FIG. 2, the motor 40 may be disposed at an outer side of the tub 20, and may be configured to rotate the drum 30 in both directions by providing power to the drum 30. The motor 40 includes a stator 100 mounted at the rear wall 21 of the tub 20, and a rotor 200 disposed at the surrounding of the stator 100 and configured to reciprocally rotate in a electromagnetic manner with respect to the stator 100.

The stator 100 may be formed through the coupling of a plurality of unit core assemblies 101, which are initially formed as a plurality of core plates 110 which are stacked one on top of another, and bent in an arc shape. At one side of the unit core assembly 101, a coupling protrusion 102 may be provided, and at the other side of the unit core assembly 101, a coupling groove 103 may be provided. The plurality of unit core assemblies 101 are coupled to each other through the coupling protrusions 102 and the coupling grooves 103, and form the stator 100 having a shape of a circle. For example, as can be seen from FIG. 2, there are three unit core assemblies 101 which are fitted together, end to end, to form the circular or ring-shaped stator 100. That is, the coupling grooves 103 and coupling protrusions 102 may be fitted together like a puzzle-piece. As can be seen from FIG. 2, each core assembly 101 may be identical to the other core assemblies 101. While the example embodiment of FIG. 2 shows three unit core assemblies 101, it is only an example, and there may be only two unit core assemblies which are fitted together to form the stator 100, or more than three unit core assemblies 101 which are fitted together to form the stator 100.

Each unit core assembly 101 includes a core body 104, a plurality of core teeth 105 protruded in a radial structure toward a direction facing a center of the unit core assembly 101 from an inner circumferential surface of the core body 104, and coils (not shown) wound around the core teeth 105.

The rotor 200 includes a plurality of rotor cores 220 disposed in a radial shape, a plurality of magnets 240 disposed in between each of the rotor cores 220, and a molding part 260 (or sleeve) configured to support the plurality of rotor cores 220 and the plurality of magnets 240.

The plurality of rotor cores 220 support the magnet 240, and form a magnetic path of the magnetic flux at the magnet 240. The plurality of rotor cores 220 are disposed along the circumferential direction of the rotor 200, and the rotor cores 220 are disposed while being spaced apart from each other so that a magnet 240 may be accommodated in between the rotor cores 220.

Each of the plurality of magnets 240 may be disposed in between a pair of rotor cores 220 and may be arranged along the circumferential direction of the rotor 200 so that the magnets 240 are positioned in a radial manner with respect to a center of the rotor 200. A rotation shaft 250 may pass through a center of the rotor 200. The magnet 240 may be a ferrite magnet capable of maintaining a magnetic charac-teristic of semi-permanently high energy density, or a magnet having a rare-earth element such as Neodymium or samarium.

The magnetic flux formed at the magnet 240 may be arranged along the circumferential direction of the rotor 200. The two magnets 240 neighboring each other may be disposed in a way that the same polarity of the two magnets 240 face each other. According to the magnetic circuit as such, the magnetic flux generated at the magnet 240 is concentrated, so that the performance of the magnet 240 may be enhanced while the size of the magnet 240 may be reduced.

The coils (not shown) may be wound around the core teeth 105 through a 3-phase connection method. When 3-phase AC power is applied to the coils (not shown), a 3-phase rotating magnetic field is formed at the stator 100. As the 3-phase rotating magnetic field and the magnetic field included in the stator 100 interact with each other, the rotor 200 may be rotated while having the rotation shaft 250 as a center.

Figure 3:
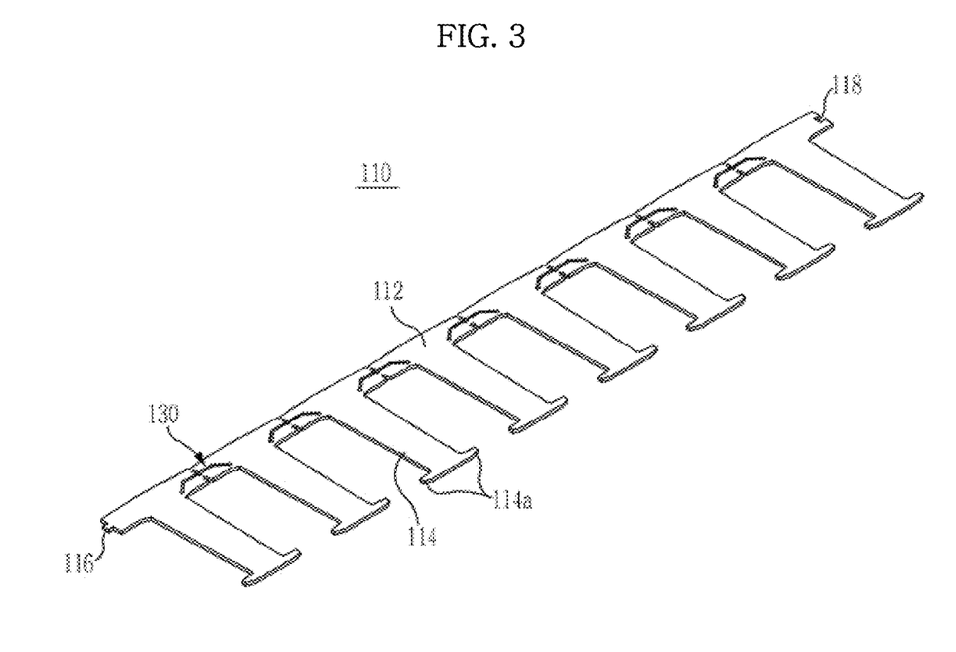
FIG. 3 is a drawing illustrating a core plate in accordance with one embodiment of the present disclosure.
Figure 4:
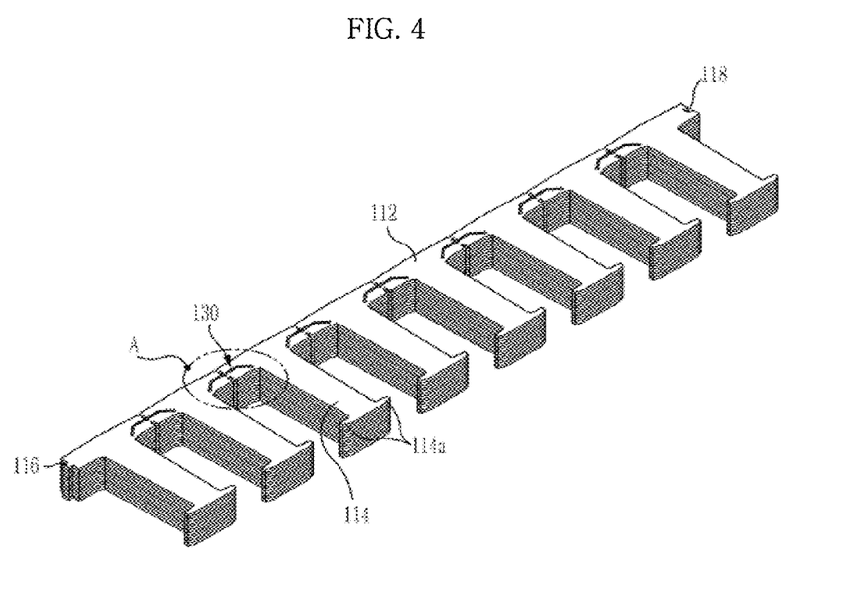
FIG. 4 is a drawing illustrating core plates being stacked in accordance with one embodiment of the present disclosure.
Figure 5:
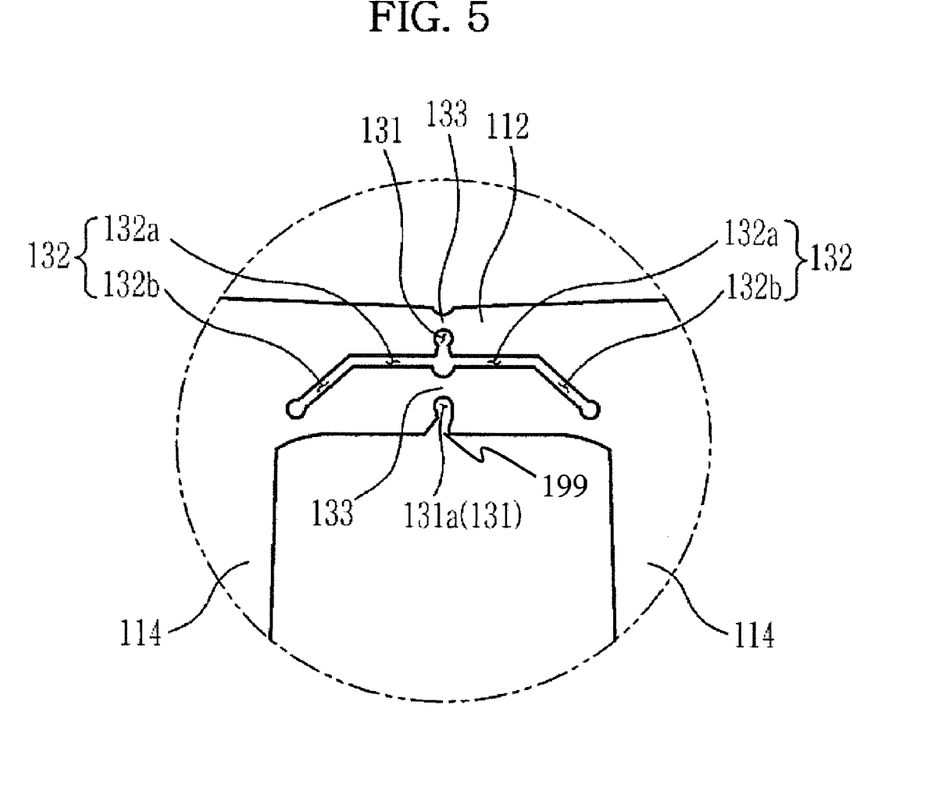
FIG. 5 is an enlarged view of the 'A' portion of FIG. 4, which illustrates a bending part before the stacked core plates are bent.
Figure 6:
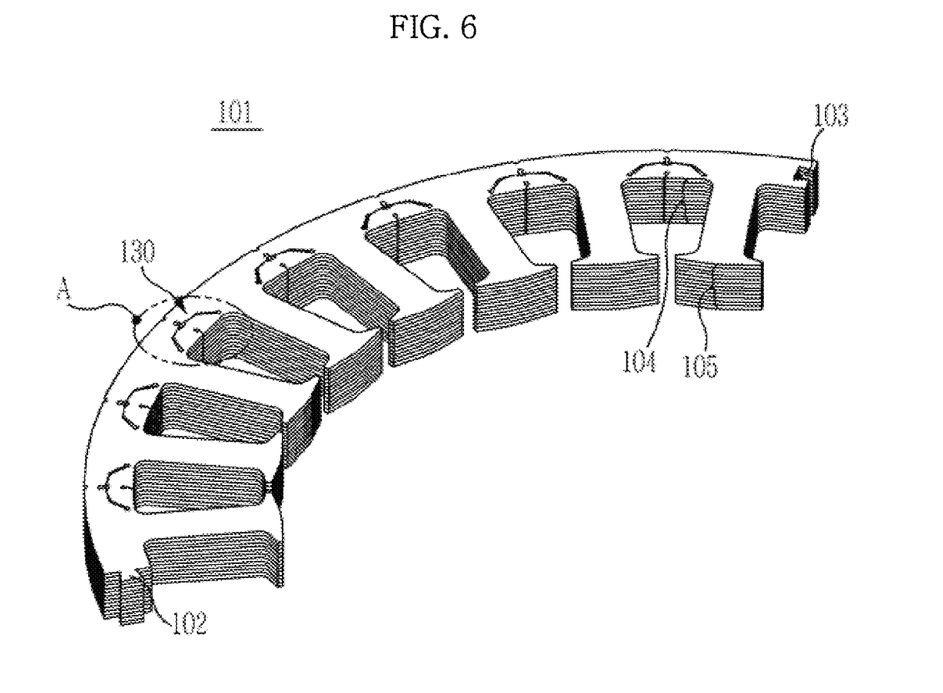
FIG. 6 is a drawing illustrating the stacked core plated of FIG. 4 being bent.
Figure 7:
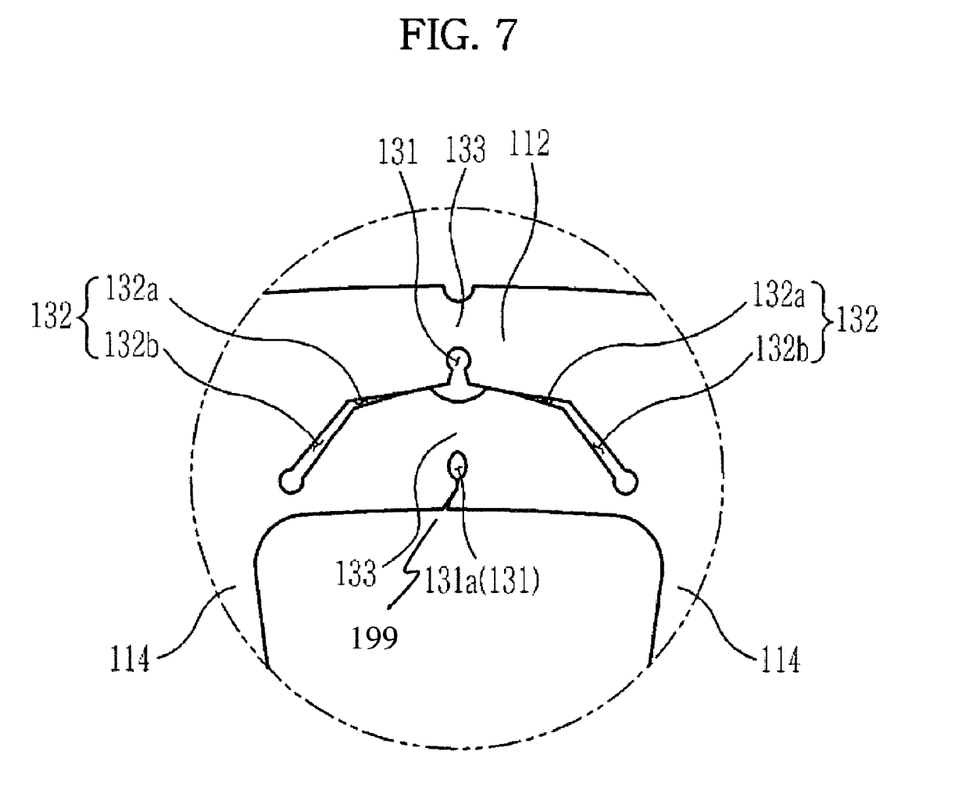
FIG. 7 is an enlarged view of the 'B' portion of FIG. 6, which illustrates the bending part that is deformed in a state when the stacked core plates are bent.

FIG. 3 is a drawing illustrating a core plate 110 in accordance with one embodiment of the present disclosure. FIG. 4 is a drawing illustrating core plates being stacked in accordance with one embodiment of the present disclosure. FIG. 5 is an enlarged view of the 'A' portion of FIG. 4, which illustrates a bending part before the stacked core plates are bent. FIG. 6 is a drawing illustrating the stacked core plated of FIG. 4 being bent. FIG. 7 is an enlarged view of the 'B' portion of FIG. 6, which illustrates the bending part that is deformed in a state when the stacked core plates are bent.

As illustrated in FIGS. 3 to 7, the unit core assembly 101 may be formed using a plurality of core plates 110 which may be stacked one on top of another and bent. The core plates 110 are configured to form a path of a magnetic flux through which a magnetic field passes through, and thus panels having the same material as metals are press-processed and formed as the core plates 110.

Prior to being bent, the core plate 110 includes a body 112 having a linear shape provided with a predetermined width, a plurality of teeth 114 extended from one side of the body 112 and arranged in a lengthways direction of the body 112, a coupling protrusion part 116 provided at one end portion of one side of the body 112, and a coupling groove part 118 provided at the other end portion of the other side of the body 112. The coupling protrusion part 116 of a first core plate may be shaped to be fit into the coupling groove part 118 of a second core plate, so that the coupling groove part 118 is shaped to accommodate the coupling protrusion part 116. The coupling protrusion parts 116 and the coupling groove parts 118, when the core plates 110 are stacked and bent to form the unit core assembly 101, form the coupling protrusion 102 and the coupling groove 103 of the unit core assembly 101, respectively. At the teeth 114 of the core plate 110, a hook part 114a may be provided to prevent a coil (not shown), which is wound around a core teeth 105 of the unit core assembly unit 101, from being separated from the core teeth 105. The hook part 114a may be substantially T-shaped, for example.

One reason for the core plate 110 being manufactured in a linear shape other than in an arc shape is to reduce the amount of scraps that are generated during a process of manufacturing the core plate 110. In a case when the core plate 110 is manufactured in a shape of an arc from the start, the process of bending the stacked core plates 110 may be omitted, but since the amount of the metal scraps being wasted is increased, the cost of manufacturing is largely increased.

In addition, in order to minimize the amount of scraps generated during the manufacturing process, one pair of core plates 100 may be press-processed together in a state of facing each other. At this time, the one pair of core plates 110 are disposed such that each of the teeth 14 of a first core plate 110 are positioned in a space in between the teeth 114 of a second core plate 110 that faces the first core plate 110.

The core plates 110 may be stacked one on top of another and bent to form the unit core assembly 101. As described above, since the core plate 110 is formed with metallic material, in order to bend the core plates 110 which are stacked one on top of another, a considerable amount of bending strength is needed. In addition, in the process of applying the bending strength to the stacked core plates 110, the core plates 110 may not be bent into a desired shape or may be damaged. Thus, in order to bend the core plates 110 into a desired shape using a relatively smaller amount of strength, at the body 112 of the core plate 110, a bending part 130 configured to induce a bending of the core plates 110 may be provided. As can be seen from FIG. 4, the bending part 130 may be disposed in between each of the teeth 114 along the body 112 of the core plate 110. More specifically, the bending part 130 may be formed in between each of the teeth 114, along an inner side of the body 112 which corresponds to the side of the body 112 from which the teeth 114 extend outward. Alternatively, the bending part 130 may be formed in between each of the teeth 114, in between an outer side of the body and the inner side of the body 112. Or, the bending part 130 may be formed in between each of the teeth 114, along an outer side of the body and an inner side of the body 112, the inner side of the body 112 corresponding to the side of the body 112 from which the teeth 114 extend outward.

The bending part 130 may include at least one first slit part 131 formed at the body 112 of the core plate 110, at least one second slit part 132, and a strength maintenance part 133 configured to maintain the strength of the core plate 110.

The first slit part 131 may be formed by slitting the body 112 in a radial direction of the body 112, and a plurality of the first slit parts 131 may be arranged in a radial direction of the body 112. From the plurality of first slit parts 131 arranged in a radial direction of the body 112, a first slit part 131a, which is most adjacent to a center of the arc that the unit core assembly 101 forms, may be provided with one end portion thereof open, so that the stacked core plates 110 may be easily bent.

For example, a plurality of first slit parts 131 may be formed in a radial direction of the body 112. That is, using the unit core assembly 101 from FIG. 2 as an example, there may be eight teeth 114 extending from the body 112. As can be seen from FIG. 2, a plurality of first slit parts 131 may be formed on the body 112 in between each adjacent tooth. Further, a center of the arc corresponds to a position on the body 112 between the fourth tooth and fifth tooth of the unit core assembly 101 (e.g., counting from left to right). Thus, the first slit part 131a may be formed only between the fourth tooth and fifth tooth of the unit core assembly 101 since this position corresponds to a position which is most adjacent to a center of the arc, the arc corresponding to a shape of the unit core assembly formed by bending a core plate 110. Alternatively, the first slit part 131a may be formed at other positions along the body 112 (e.g., at positions which are the next most adjacent to the center of the arc).

As another example, there is a space between each of the teeth 114 of a core plate 110. The first slit part 131a may be formed in the body 112 at the center of this space between each of the teeth of the core plate 110.

The second slit part 132 may be formed by slitting in an approximately circumferential direction of the body 112, and may include a horizontal slit part 132a formed in a parallel direction with respect to an inner circumferential surface or to an outer circumferential surface of the body 112, and may further include an inclination slit part 132b formed in an inclined manner from one or both end portions of the horizontal slit part 132a. The inclination split part 132b may be angled toward the inner circumferential surface of the arc formed by the unit core assembly 101 or toward the teeth 114. The horizontal slit part 132a is communicated with at least one of the plurality of first slit parts 131 while intersecting with the at least one of the plurality of first slit parts 131, so that the stacked core plates 110 may be easily bent.

During a process of bending the stacked core plates 110, a region adjacent to the inner circumferential surface of the core plates 110 has a stress in a direction that the core plates 110 face each other. On the contrary, a region adjacent to the outer circumferential surface of the core plates 110 has a stress in a direction that the core plates 110 are spaced apart from each other (e.g., in a substantially vertical direction if the stacked core plates 110 lie in a horizontal plane). Referring to the above, one reason why the first slit part 131a, which is most adjacent to the center of the arc formed by the unit core assembly 101, among the plurality of first slit parts 131, is provided with one end portion thereof open, and the inclination slit part 132b is formed in an inclined manner from both end portions of the horizontal slit part 132a toward the inner circumferential surface of the arc formed by the unit core assembly 101 or toward the teeth 114 is due to the above-mentioned stresses which are applied during a process of bending the stacked core plates 110. Accordingly, by positioning the first slit part 131 and the second slit part 132 at adjacent positions with respect to the inner circumferential surface of the core plates 110, the strength needed to bend the core plates 110 may be reduced.

In addition, the second slit parts 132 may be disposed in a symmetric manner to each other while having the first slit part 131 therein between. Thus, in the process of bending the stacked core plates 110, the strength being applied at the bending part 130 is evenly distributed, so that the stacked core plates 110 may be bent into a desired shape at all times.

The plurality of strength maintenance parts 133 are alternately disposed with the first slit parts 131 in a radial direction of the body 112. That is, in the radial direction of the body 112, in between the first slit parts 131, the strength maintenance part 133 is positioned, and in between the strength maintenance parts 133, the first slit part 131 is disposed. For example, as can be seen from FIG. 5, the body 112 has an outer side and an inner side, the inner side corresponding to the side from which the teeth 114 protrude. A first strength maintenance part 133 may be positioned between the outside of the body 114 and the first slit part 131, and a second strength maintenance part 133 may be positioned between the first split part 131 and the first slit part 131a provided with one end portion thereof open so as to have an opening 199 along the inner side of the body 112.

In accordance with the above, by structuring the strength maintenance parts 133 in plurality, that is, two or more of the strength maintenance parts 133, the strength of the unit core assembly 101 formed as the core plates 110 are bent, is maintained. Also, the strength of the stator 100 formed as the unit core assemblies 101 are coupled to each other, is maintained. In the process of the rotor 200 being rotated, the noise by the mechanical vibration of the stator 100 or the noise by the electromagnetic vibration is reduced.

The bending part 130 may be disposed in between adjacent teeth 114. Since when the core plates 110 are stacked and bent, a portion of the body 112 adjacent to the teeth 114 is provided with less strain by the strength applied during the bending process, and the portion of the body 112 adjacent to the teeth 114 is categorized as a magnetic flux path through which a magnetic field passes, if the bending part 130 is formed at the portion adjacent to the teeth 114, a leakage of the magnetic flux may be occurred through the bending part 130.

Hereinafter, a process and a principle of the stacked core plates 110 being bent by the bending part 130 formed at the core plates 110 will be described.

Figure 8:
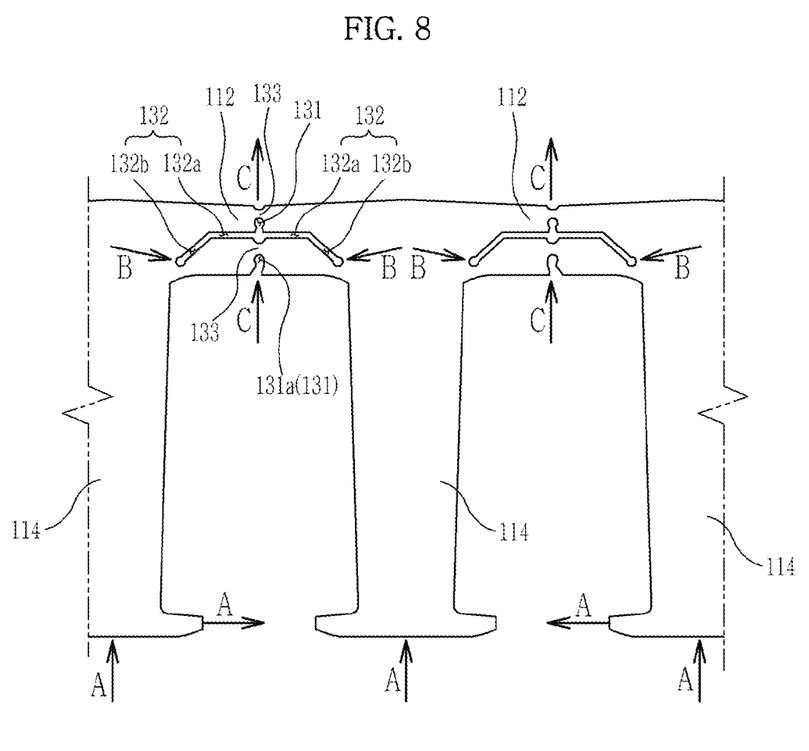
FIG. 8 is a drawing to describe a principle of the stacked core plates being bent by the bending part.

FIG. 8 is a drawing to describe a principle of the stacked core plates being bent by using the bending part.

As illustrated in FIG. 8, in order to bend the stacked core plates 110, when a strength or force is applied in an 'A' direction, stress is generated in the 'B' direction at the inclination slit part 132*b* of the second slit part 132, and stress is generated in a 'C' direction at the first slit part 131 and the horizontal slit part 132*a* of the second slit part 132, and a deformation of the core plates 110 takes place while having a position, at which the first slit part 131 and the second slit part 132 intersect to each other, as a center (e.g., a center of the stress generated in the 'A' and 'B' directions).

The width of a region of the first slit part 131 that is adjacent to the teeth 114 is further decreased by a larger scale, and the width of a region of the second slit part 132 adjacent to the first slit part 131, that is, the horizon slit part 132*a* is further decreased by a larger scale, and thus the stacked core plates 110 are bent in a shape of a circle (or semi-circle, quarter-circle, or other arc shape) to form the unit core assembly 101. For example, as can be seen from FIGS. 7 and 8, the width of the inlet portion of first slit part 131*a* is decreased to a larger degree than when compared to the deformation which occurs to first slit part 131 which communicates with the second split part 132. For example, as can be seen from FIGS. 7 and 8, the width in the radial direction of the horizontal slit part 132*a* is decreased to a larger degree than when compared to the deformation which occurs to inclination slit part 132*b*. Further, the overall width of the second split part 132 is decreased in the circumferential direction along the body 112 due to the bending of the core plates.

By composing the bending part 130 using the first slit part 131 and the second slit part 132 both of which are slit in different directions to each other, a bending force applied to the stacked core plates 110 may be performed by use of a relatively small strength compared to conventional bending methods.

The disclosure herein has provided example embodiments of a motor. However the disclosure is not limited to particular embodiments described herein. For example, although the motor has been described as being applicable to the washing machine shown in FIG. 1, it may be applied to other types of washing machines, for example, a top loading washing machine. Further, the motor may be applied to other types of machines, for example, an air conditioner, an electric vehicle, a light rail vehicle, and an electric bicycle, a small generator, and the like.

Although a few example embodiments of the present disclosure have been shown and described, it would be appreciated by those skilled in the art that changes may be made to these embodiments without departing from the principles and spirit of the disclosure, the scope of which is defined in the claims and their equivalents.

What is claimed is:

1. A motor comprising:
    a stator formed with a plurality of core plates stacked one on top of another; and
    a rotor rotatably provided to electromagnetically interact with the stator,
    wherein each core plate comprises:
        a body provided in a shape of an arc comprising a first end and a second end;
        a plurality of teeth radially extended from a first side of the body and provided between the first end and the second end of the body;
        at least one first slit part formed on the body between the first side of the body and a second side of the body and between the first end and the second end of the body, wherein the at least one first slit part is spaced apart from the second side of the body and elongated in a radial direction of the body; and
        at least two second slit parts formed on the body and elongated in a circumferential direction of the body, the at least two second slit parts being symmetrically disposed to each other while interposing the at least one first slit part thereinbetween.

2. The motor of claim 1, wherein:
    at least one first slit part communicates with at least one of the at least two second slit parts.

3. The motor of claim 1, wherein:
    the at least one first slit part and at least one of the at least two second slit parts are disposed between two teeth adjacent to each other among the plurality of teeth.

4. The motor of claim 3, wherein:
    the body comprises a plurality of strength maintenance parts disposed adjacent to the at least one first slit part and at least one of the at least two second slit parts to maintain a strength of the body between the plurality of teeth.

5. The motor of claim 4, wherein:
    the plurality of strength maintenance parts comprise:
    a first strength maintenance part disposed between two first slit parts which are elongated in the radial direction of the body, and
    a second strength maintenance part disposed between one of the two first slit parts and the second side of the body which is opposite to the first side of the body from which the plurality of teeth radially extend.

6. The motor of claim 1, wherein:
    the stator comprises a plurality of unit core assemblies coupled together, and
    each unit core assembly among the plurality of unit core assemblies comprises a plurality of core plates which are provided in the shape of an arc and are stacked one on top of another.

7. The motor of claim 6, wherein:
    at least one first slit part is provided between two adjacent teeth and has an opening along the first side of the body from which the plurality of teeth radially extend, and
    a width of a portion of the at least one first slit part at the opening is less than a width of another portion of the at least one first slit part spaced apart from the first side of the body.

8. The motor of claim 6, wherein:
    a width of a portion of at least one of the at least two second slit parts which is closer to the at least one first slit part than a remaining portion of the at least one of the at least two second slit parts is less than a width of the remaining portion of the at least one of the at least two second slit parts.

9. A washing machine comprising:
a body;
a tub disposed inside the body to store washing water;
a drum disposed inside the tub while being rotatably supported by the tub through a driving shaft; and
a motor mounted at the tub and configured to rotate the driving shaft, wherein the motor comprises:
a stator formed with a plurality of core plates stacked one on top of another; and
a rotor rotatably provided to electromagnetically interact with the stator,
wherein each core plate comprises:
a body provided in a shape of an arc comprising a first end and a second end;
a plurality of teeth radially extended from a first side of the body and provided between the first end and the second end of the body;
at least one first slit part formed on the body between the first side of the body and a second side of the body and between the first end and the second end of the body, wherein the at least one first slit part is spaced apart from the second side of the body and elongated in a radial direction of the body; and
at least two second slit parts formed on the body and elongated in a circumferential direction of the body, the at least two second slit parts being symmetrically disposed to each other while interposing the at least one first slit part thereinbetween.

10. The washing machine of claim 9, wherein:
the body comprises a plurality of strength maintenance parts disposed adjacent to the at least one first slit part and at least one of the at least two second slit parts to maintain a strength of the body between the plurality of teeth.

11. The washing machine of claim 10, wherein:
the plurality of strength maintenance parts are disposed between at least two first slit parts which are elongated in the radial direction of the body.

12. The washing machine of claim 9, wherein:
the stator comprises a plurality of unit core assemblies coupled together,
each unit core assembly among the plurality of unit core assemblies comprises a plurality of core plates which are provided in the shape of an arc and are stacked one on top of another,
at least one first slit part is provided between two adjacent teeth and has an opening along the first side of the body from which the plurality of teeth radially extend,
a width of a portion of the at least one first slit part at the opening is less than a width of a remaining portion of the at least one first slit part, and
a width of a portion of at least one of the at least two second slit parts which is closer to the at least one first slit part than a remaining portion of the at least one of the at least two second slit parts is less than a width of the remaining portion of the at least one of the at least two second slit parts.

13. The washing machine of claim 9, wherein:
at least one first slit part is provided with an opening along the first side of the body from which the plurality of teeth radially extend.

14. A motor for a washing machine configured to be used to rotate a drum of the washing machine, the motor comprising:

a stator formed with a plurality of core plates stacked one on top of another; and
a rotor rotatably provided to electromagnetically interact with the stator,
wherein each core plate comprises:
a body provided in a shape of an arc comprising a first end and a second end;
a plurality of teeth radially extended from a first side of the body and provided between the first end and the second end of the body;
at least two first slit parts formed at a portion of the body, the at least two first slit parts being positioned between two teeth which are adjacent to each other among the plurality of teeth, and being elongated in a first direction; and
at least one second slit part disposed between the at least two first slit parts, and elongated in a second direction different from the first direction,
wherein
one of the two first slit parts is provided between the first side of the body and a second side of the body, between the first end and the second end of the body, and spaced apart from the second side of the body, and
the at least two first slit parts are symmetrically disposed to each other while interposing the at least one second slit part thereinbetween.

15. The motor of claim 14, wherein:
at least one other second slit part is disposed between and spaced apart from the at least two first slit parts.

16. The motor of claim 14, wherein:
the stator comprises a unit core assembly,
the unit core assembly comprises a plurality of core plates which are stacked one on top of another and which are provided in the shape of an arc, and
for each of the plurality of core plates of the unit core assembly, a position at which the at least two first slit parts and the at least one second slit part intersect each other corresponds to a center of a space between adjacent teeth.

17. A stator comprising:
a plurality of core plates stacked one on top of another, wherein each core plate comprises:
an arc-shaped body comprising a first end and a second end, wherein a plurality of teeth extend from one side of the body in a first direction, and the body is elongated in a second direction from the first end to the second end;
a first slit part formed in the body in the first direction, between two adjacent teeth which are provided between the first end and the second end of the body;
a second slit part formed in the body in the first direction, between the two adjacent teeth, and having an opening at the one side of the body from which the plurality of teeth extend; and
a third slit part formed in the body in the second direction, communicating with the first slit part.

18. The stator of claim 17, wherein the third slit part includes:
a first portion elongated in the second direction which communicates with the first slit part; and
a second portion which extends at an angle from the first portion toward the one side of the body from which the teeth extend.

19. The stator of claim 18, wherein each core plate further comprises a plurality of strength maintenance parts, including a first strength maintenance part disposed between the first slit part and the second slit part, and a second strength maintenance part disposed between the first slit part and a side of the body opposite to the one side of the body from which the teeth extend.

* * * * *